United States Patent

[11] 3,559,549

[72] Inventor Martin S. Ackerman
 East Hills, N.Y.
[21] Appl. No. 699,622
[22] Filed Jan. 22, 1968
[45] Patented Feb. 2, 1971
[73] Assignee Perfect Film & Chemical Corporation
 Manhasset, N.Y.
 a corporation of Delaware
 Continuation-in-part of application Ser. No.
 643,088, June 2, 1967, Patent No.
 3,364,829.

[54] RECHARGEABLE FLASH ATTACHMENT
 6 Claims, 5 Drawing Figs.
[52] U.S. Cl. .................................................. 95/11.5,
 95/86
[51] Int. Cl. ..................................................... G03b 9/70
[50] Field of Search ........................................... 95/11, 11.5,
 86; 240/1.3, 2C, 10.6R, 52.1, 52.5

[56] References Cited
 UNITED STATES PATENTS
 2,671,629 3/1954 Mendelsohn ................. 95/11.5X

| | | | |
|---|---|---|---|
| 2,755,714 | 7/1956 | Germeshausen ............ | 95/11.5 |
| 3,134,547 | 5/1964 | Kapteyn et al. ............... | 240/1.3 |
| 3,353,467 | 11/1967 | Ernisse et al. ................ | 95/11.5 |
| 3,358,573 | 12/1967 | Bihlmaier .................... | 95/11 |
| 3,437,021 | 4/1969 | Kapteyn et al. ............... | 95/11 |

*Primary Examiner*—John M. Horan
*Assistant Examiner*—Fred L. Braun
*Attorney*—Kenneth S. Goldfarb ABSTRACT: A rechargeable stroboscopic flash attachment on a camera which includes a fitting rotatably mounted in a housing and adapted to be diposed in a flash-cube-receiving receptacle of a camera for actuating the shutter control mechanism. Contact members are also secured to the housing for engaging the electric contacts in the receptacle. Electronic time-delay elements are mounted in the housing as is a stroboscopic electronic lamp. The time-delay elements effectively delay actuation of the flash unit so as to synchronize the flash unit with the timing induced by the shutter control mechanism. The power pack for the flash attachment is suspended from the camera by clips secured to and depending from a bracket clampingly engaging the camera.

PATENTED FEB 2 1971
3,559,549
SHEET 1 OF 2
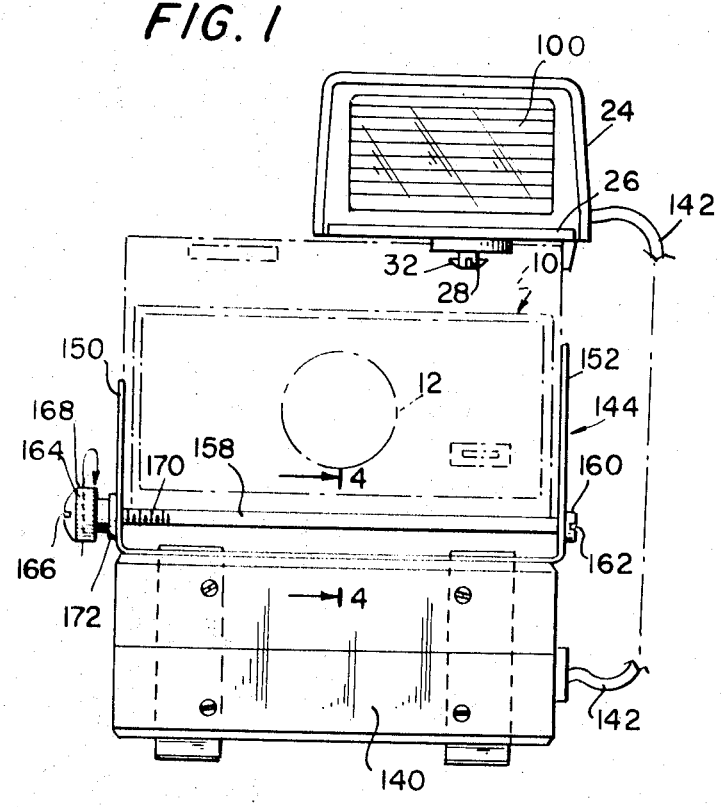
FIG. 1
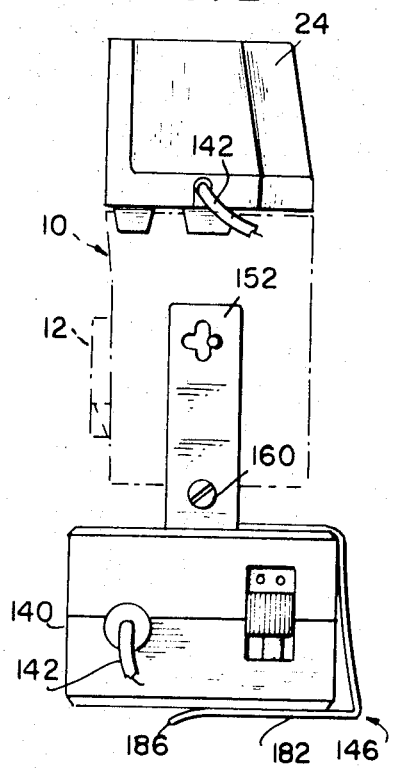
FIG. 2
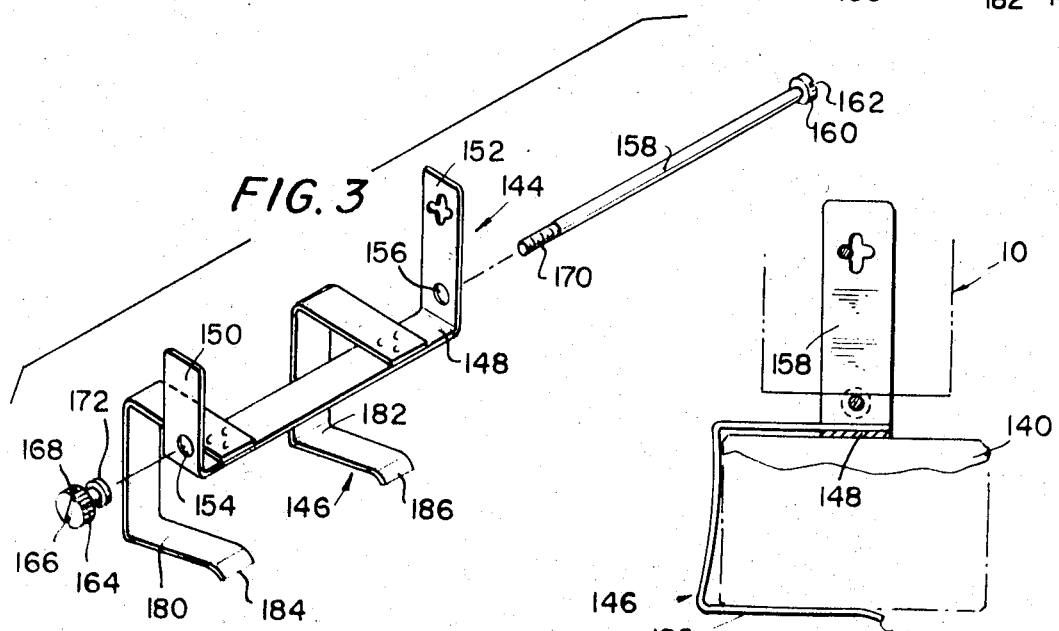
FIG. 3
FIG. 4
INVENTOR.
MARTIN S. ACKERMAN
BY
Kenneth S. Goldfarb
ATTORNEY

INVENTOR.
MARTIN S. ACKERMAN

RECHARGEABLE FLASH ATTACHMENT

This application is a continuation-in-part of application Ser. No. 643,088, filed Jun. 2, 1967, now U.S. Pat. No. 3,364,829.

This invention relates to a rechargeable stroboscopic flash attachment for a camera having a flashbulb or flash cube operating circuit.

Various types of cameras have been devised which are adapted for either daylight photography or or flash cube photography. Such cameras may be of the type disclosed in the U.S. Pat. to L.F. Anderson et al., No. 3,244,087, and employ a shutter mechanism which operates without any time delay during daylight photography but which camera is provided with a flashlamp synchronizing mechanism for producing a delay when flashlamps or flash cubes are employed. This is necessitated because of the delay in reaching the peak light intensity of the flashlamp or flash cube. Such a synchronizing mechanism is disclosed in the U.S. Pat. to D.M. Petersen, No. 3,139,805.

In the U.S. Pat. to O.T. Casebeer et al., No. 3,312,086, there is disclosed an indexing mechanism used in connection with flash cubes for rotating the flash cube so as to present and unused flashbulb in the front of the camera for successive firing.

Briefly, the concept of this invention is to provide a rechargeable stroboscopic flash attachment and means for mounting the attachment in a simple manner on a camera employing a flash-cube-receiving receptacle having a pair of electrical contacts connected to the flash cube operating circuit on the camera and having a shutter control mechanism and having a flash cube indexing mechanism. In accomplishing the purpose of the invention, a housing having electronic time-delay means therein and a rechargeable stroboscopic flash unit is fixedly through detachably mounted above the camera and has a fitting rotatably mounted and extending therebelow for insertion in the flash-cube-receiving receptacle. Attachment means clampingly engage the camera and depending therefrom are clips which hold the rechargeable battery suspended below the camera. Contact means also depend from the housing for engaging the contacts in the flash-cube-receiving receptacle which are connected to the flash cube or flashlamp operating circuit.

An object of the invention resides in the provision of means for conveniently mounting an electronic flash attachment of the rechargeable type on a camera so as to permit a compact unit to be achieved and to eliminate the necessity for the repeated purchase and use of flashbulbs or flash cubes, thus greatly reducing the cost to the user of flash photography.

Another object of the present invention resides in the provision of means to insure operation of the flash unit by provision of a capacitor which coil provides sufficient voltage to insure operation of the flash unit.

Other objects and features of the present invention reside in the provision of a rechargeable electronic stroboscopic flash attachment for various types and models of cameras now in existence and to be produced in the future that is simple in construction, inexpensive to manufacture, thereby permitting wide distribution and utilization, and which is durable, light in weight, compact and attractive in appearance.

These, together with the various ancillary objects and features of the present invention, which will become apparent as the following description proceeds, are attained by this electronic rechargeable flash attachment, a preferred embodiment of which is shown in the accompanying drawing, by way of example only, wherein:

FIG. 1 is a front elevational view showing the flash attachment as mounted on a camera;

FIG. 2 is a side elevational view of the flash attachment;

FIG. 3 is a perspective view of the attachment means and holding means used in the invention;

FIG. 4 is a sectional detail view taken along the plane of line 4—4 in FIG. 1.

Figure 5:
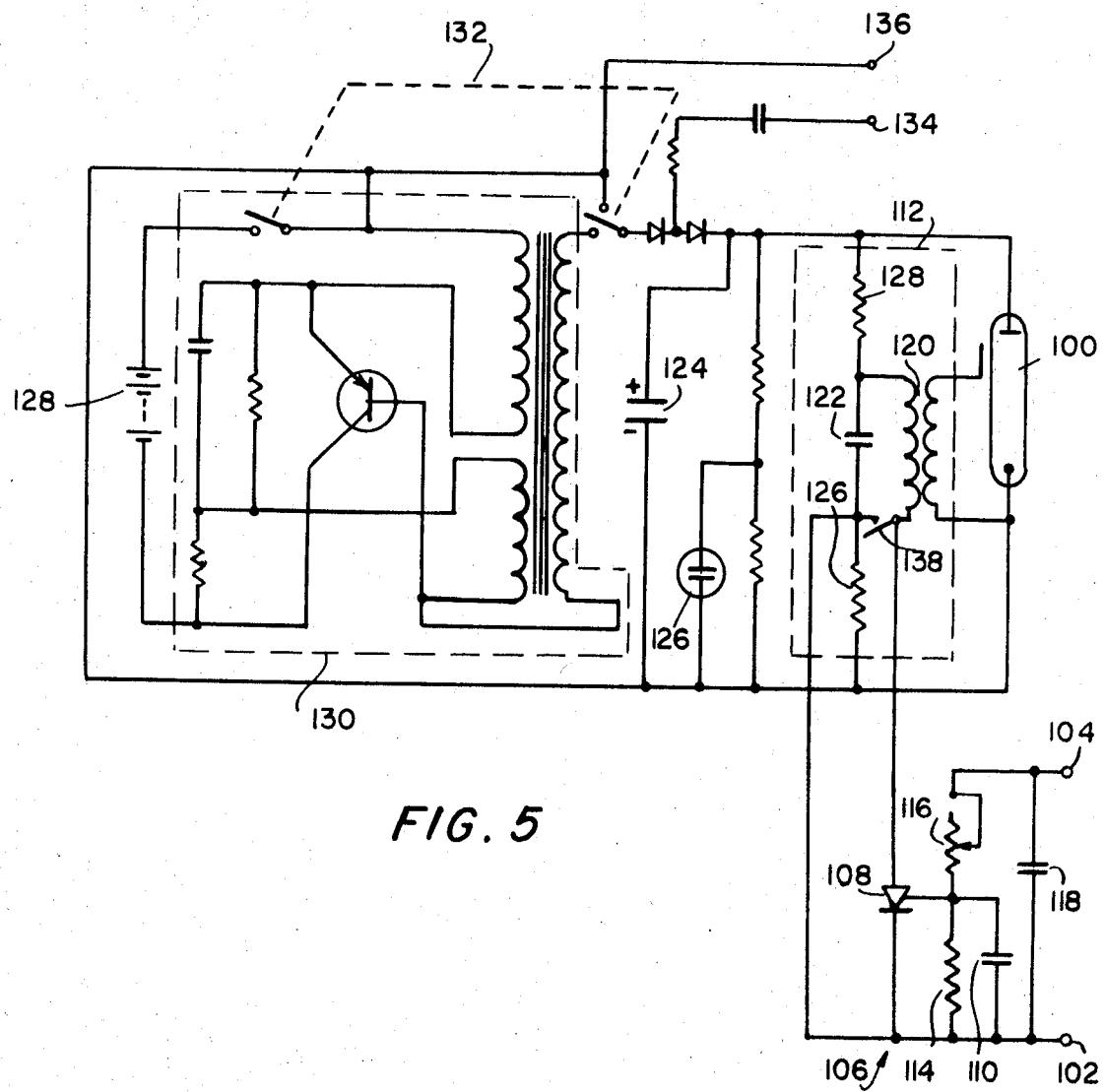
FIG. 5 is a schematic wiring diagram of the electrical components of the invention.

With continuing reference to the accompanying drawing wherein like reference numerals designate similar parts throughout the various views, reference numeral 10 is used to generally designate a camera having a lens opening 12 which is provided with a shutter mechanism, not shown. The camera 10 has its top 14 provided with a flash-cube-receiving receptacle having therein prong-receiving sections and a mechanism of the type disclosed in U.S. Pat. No. 3,364,829. This mechanism is for the purpose of delaying the operation of the shutter mechanism until the flash cube or flashlamp normally used with the camera has reached its peak light intensity.

In carrying out the present invention, the flash attachment includes a suitable housing 24 having a base plate 26 in which a fitting 28 is rotatably mounted and journaled. The fitting 28 includes four actuating prongs 32 adapted to seat in the flash-cube-receiving receptacle and are electrically connected by a pair of terminals 102 and 104 to the flash cube or flashlamp actuating circuit of the camera 10. Referring now to FIG. 5, it will be noted that herein is disclosed the electrical and electronic components which function in cooperation with the shutter actuating mechanism of the camera to control the operation of the stroboscopic flash tube 100 mounted in housing 24. Connected across the shutter flash tube firing terminals of the camera (not shown) at the terminals 102 and 104 is the time-delay firing mechanism generally indicated at 106. This electronic time-delay mechanism includes silicon control rectifier 108 connected to capacitor 110 having a value in the order of 1 microfarad. In order to control the time necessary to charge the capacitor 110 to control the firing of the flash tube firing circuit generally indicated at 112 there is a fixed resistor 114 of 4,000 ohms. A variable potentiometer in series with the resistor 114 and of the order of 0 to 10,000 ohms is indicated at 116. A capacitor 118 of relatively large capacity in the order of 50 microfarads is connected in parallel with the potentiometer 116 and resistor 114 and is for the purpose of maintaining sufficient voltage across the time-delay firing circuit so that even if the closure between terminals 102 and 104 opens at an early period the time-delay circuit will remain operative and the flash tube 100 will fire. The flash tube firing circuit 112 includes a trigger coil 120 for providing sufficient voltage for actuating the flash tube 100 and capacitor 122 and which is connected across the storage capacitor 124 and protected by resistors 126 and 128. A neon ready light 126 is provided to indicate when the storage capacitor 124 is charged and ready to and capable of actuating the flash tube 100.

A rechargeable battery 128 having an output voltage of 3 to 6 volts is connected through an oscillator circuit 130 for energizing capacitor 124 at a voltage in the order of 300 to 320 volts.

A double-pole, double-throw position switch 132 is provided for selectively connecting the capacitor 124 across the oscillator circuit 130 or across an alternating current power source at terminals 134 and 136.

The neon ready light is mounted in any convenient location on the housing 24 and a test switch 138 is provided for checking the operation of the flash tube 100.

The battery 128 is mounted in a suitable case 140 and is adapted to be connected to the housing through suitable leads 142. The battery is adapted to be connected through terminals 134 and 136 to a source of electrical power such as a conventional home electric outlet. The battery case 140 is adapted to be conveniently suspended from the camera 110 by suitable assembly including attachment means generally indicated at 144 and a holding means generally indicated at 146. The attachment means includes a substantially U-shaped bracket 148 having a pair of arms 150 and 152. The arms may be perforated or recessed to receive pins, studs or the like fixed on the camera, if such is desired. The arms are provided with apertures 154 and 156 through which the rod 158 extends. The rod 158 is provided with a head 160 having a kerf 162 therein for enabling the convenient adjustment and a rotation of the rod using a screwdriver or other suitable tool. An adjustment head 164 also provided with a kerf 166 therethrough and having a knurled sidewalls 168 adapted to be threadedly engaged on the threaded end 170 of the rod 158 and has a bearing portion 172 of larger diameter than the aperture 154 so that rotation of the head 164 relative to the rod 158 will cause the arms 150 and 152 to be clampingly engaged with the sidewalls of the camera, the arms 150 and 152 being somewhat flexible.

Welded or riveted to the bracket 148 are a pair of C-shaped clips 180 and 182 which have downwardly turned lower edges 184 and 186 for conveniently receiving and clampingly holding the case 140. These clips 180 and 182 form the holding means 146 and suspend the battery case 140 below the camera in a compact and convenient arrangement.

A latitude of modification, substitution and change is intended in the foregoing disclosure and in some instances, some features of the invention will be employed without a corresponding use of other features. Accordingly, it is appropriate that the appended claims be construed broadly and in a manner consistent with the spirit and scope of the invention herein.

I claim:

1. A rechargeable stroboscopic flash attachment on a camera having a flash-cube-receiving receiving receptacle and a shutter control mechanism, comprising a housing having a rechargeable stroboscopic flash unit therein, means securing said housing to said camera and including a fitting at least partially disposed in said housing and being rotatably mounted thereon, said fitting extending into said receptacle, shutter operating means for synchronizing said flash unit with said shutter control mechanism to operate said flash unit in correctly timed relationship therewith, a rechargeable battery forming an electrical power source, attachment means secured to said camera and holding means suspended from said attachment means, said battery being received and supported by said holding means.

2. A rechargeable stroboscopic flash attachment on a camera having a flash cube operating circuit and a flash-cube-receiving receptacle provided with a pair of electrical contacts connected to said flash cube operating circuit and having a shutter control mechanism and a flash cube indexing mechanism, comprising a housing having a rechargeable stroboscopic flash unit therein, means fixedly securing said housing to said camera and including a fitting at least partially disposed in said housing and being rotatably mounted thereon, said fitting extending into said receptacle for actuating said shutter control mechanism, contact means secured to said housing engaging said pair of electrical contacts, time-delay operating means in said housing electrically connected to said contact means for time delaying a signal from said flash cube operating circuit, said rechargeable stroboscopic flash unit being operatively electrically connected to said time-delay operating means so that said time-delay operating means effectively delays actuating of said flash unit so as to synchronize said flash unit with the timing induced by said shutter control mechanism, a rechargeable battery forming an electrical power source, attachment means secured to said camera, and holding means connected to said attachment means, said battery being received and supported by said holding means.

3. A rechargeable stroboscopic flash attachment according to claim 2, wherein said time-delay operating means includes a capacitor for maintaining sufficient voltage across said flash unit after actuation to insure operation of said flash unit.

4. A rechargeable stroboscopic flash attachment according to claim 3, wherein said attachment means includes a bracket having arm means for engaging a camera, threaded rod means extending through said arm means for engaging said arm means to clampingly engage said camera, said holding means including a pair of substantially C-shaped clips secured to said bracket and depending therefrom.

5. A rechargeable stroboscopic flash attachment on a camera comprising a housing having a rechargeable stroboscopic flash unit therein, means securing said housing on same camera thereabove, a rechargeable battery forming an electrical power source, operating means electrically connected to said battery and said flash unit for operating said flash unit in synchronized timed relationship with said camera, attachment means adjustably detachably secured to said camera, and holding means secured to said attachment means, said battery being received and supported by said holding means below said camera, said attachment means including a bracket having a pair of camera engaging arms, and threaded rod means extending through said arms for urging said arms to clampingly engage said camera.

6. A rechargeable stroboscopic flash attachment according to claim 5, wherein said holding means include a pair of substantially C-shaped clips secured to said bracket and suspending therefrom.